United States Patent
Ockborn et al.

(10) Patent No.: US 7,779,541 B2
(45) Date of Patent: Aug. 24, 2010

(54) METHOD FOR MANUFACTURING A STATOR OR ROTOR COMPONENT

(75) Inventors: Johan Ockborn, Trollhättan (SE); Johan Högström, Vänersborg (SE)

(73) Assignee: Volvo Aero Corporation (SE)

( * ) Notice: Subject to any disclaimer, the term of this patent is extended or adjusted under 35 U.S.C. 154(b) by 706 days.

(21) Appl. No.: 10/709,683

(22) Filed: May 22, 2004

(65) Prior Publication Data

US 2005/0000091 A1    Jan. 6, 2005

Related U.S. Application Data

(63) Continuation of application No. PCT/SE02/02029, filed on Oct. 8, 2002, now abandoned.

(30) Foreign Application Priority Data

Nov. 22, 2001  (SE) .................................. 0103892

(51) Int. Cl.
*B21K 25/00* (2006.01)
(52) U.S. Cl. .............. 29/889.21; 29/889.23; 416/213 R
(58) Field of Classification Search ............. 29/889.21, 29/889.23; 416/204 R, 209, 213 R, 216, 416/215, 218
See application file for complete search history.

(56) References Cited

U.S. PATENT DOCUMENTS

| | | | | |
|---|---|---|---|---|
| 1,286,283 A | * | 12/1918 | Gilson | 29/889.21 |
| 1,470,499 A | | 10/1923 | Steenstrup | |
| 1,470,507 A | * | 10/1923 | Steenstrup | 29/889.21 |
| 1,621,002 A | * | 3/1927 | Dimberg | 164/76.1 |
| 1,641,745 A | * | 9/1927 | Dimberg | 228/254 |
| 1,833,754 A | * | 11/1931 | Paget | 416/215 |
| 2,347,034 A | * | 4/1944 | Doran | 416/191 |
| 2,633,776 A | * | 4/1953 | Schenk | 409/132 |
| 3,708,846 A | * | 1/1973 | Worner | 29/889.5 |
| 4,146,165 A | * | 3/1979 | Lesgourgues et al. | 228/161 |
| 4,812,107 A | | 3/1989 | Barcella et al. | |
| 5,174,715 A | | 12/1992 | Martin | |
| 5,609,471 A | * | 3/1997 | Frasier et al. | 416/204 A |

FOREIGN PATENT DOCUMENTS

WO    WO 9806958 A1    2/1998

* cited by examiner

*Primary Examiner*—David P Bryant
*Assistant Examiner*—Sarang Afzali
(74) *Attorney, Agent, or Firm*—Novak Druce + Quigg, LLP

(57) ABSTRACT

Method for manufacturing a stator component or rotor component (10) including at least one ring element (3). A joining material is provided in contact with at least one of the blade (2) and the ring element (3). The blade and the ring element are arranged in relation to one another in such a way that they are joined together via a butt joint when heated, and when such heat-treatment is subsequently carried out, the joining material forms a melt that joins the parts together upon solidification.

2 Claims, 6 Drawing Sheets

METHOD FOR MANUFACTURING A STATOR OR ROTOR COMPONENT

CROSS-REFERENCE TO RELATED APPLICATIONS

The present application is a continuation patent application of International Application No. PCT/SE02/02029 filed 8 Nov. 2002 which was published in English pursuant to Article 21(2) of the Patent Cooperation Treaty, and which claims priority to Swedish Application No. 0103892-6 filed 22 Nov. 2001. Both applications are expressly incorporated herein by reference in their entireties.

TECHNICAL FIELD

The present invention relates to a method for manufacturing a stator component or rotor component in which at least one blade is joined together with at least one ring element. The blade is often called a guide vane when applied in stators and is intended in operation to guide or deflect a gas flow. When applied in rotors, the blade is usually used for both guiding and power transmission. The term ring element means a continuous ring, a ring which is discontinuous in the peripheral direction, or a part of which is intended, together with other similar parts, to form a ring.

The invention is described herein primarily with respect to an embodiment in which the ring element forms what may be referred to as a cover. The cover is arranged outside, or inside, the blade in the radial direction and in contact therewith so as during operation to counteract leakage from a pressure side to a suction side of the blade and vibrations. Such leakage is associated with efficiency losses and the vibrations are associated with an increase in fatigue cracks. The invention is not to be regarded as being limited to this use, but can also be used in other applications.

According to one example, the stator component or rotor component comprises a plurality of blades which are arranged at a mutual spacing on a circular path and project in the radial direction from a central part, or what is known as a hub. The cover is arranged outside the blades in the radial direction, in the form of a continuous ring.

Above all, the invention is aimed at specific applications which require extremely thin blade edges and close tolerances.

The stator component or rotor component can therefore be used in both static applications (stators) and dynamic applications (rotors). The component can also find application in both turbines and compressors. For rotors, the component is commonly referred to as a "blisk" (bladed disk) or a "bling" (bladed ring).

The stator component or rotor component can, for example, be arranged in a turbopump in a space application. For purposes of the present disclosure, the term "turbopump" should be taken to mean a unit which comprises (includes, but is not limited to) at least a turbine and a pump part driven by the latter.

The invention is not to be regarded as being limited to this application, but can also, for example, be used in a gas turbine or jet engine. The areas of application of the component are, for example, in engines for vehicles, aircraft, power plant equipment for vessels and power stations for electricity production.

BACKGROUND ART

Cover parts are known that are manufactured with a through-opening in the radial direction which is intended for passing a portion of a blade therethrough. More precisely, the blade is guided so far into the opening that the blade protrudes on the other side of the cover part. The blade is then typically soldered or welded firmly to the cover part, and, if appropriate, the projecting portion of the blade is cut and ground down in order to produce an essentially smooth surface.

DISCLOSURE OF INVENTION

One object of the present invention is to provide a method for manufacturing a stator component or rotor component which is more time-efficient and/or cost-effective than known methods and arrangements. The invention also aims to achieve a manufacturing method which creates possibilities for a component with great strength and high efficiency.

This object is achieved by virtue of the fact that a joining material is provided in contact with at least one of the blade and/or the ring element. The blade and the ring element are arranged in relation to one another in such a way that they are joined together via a butt joint when heated. The heat-treatment is subsequently carried out so that the joining material forms a melt which connects the parts together when the melt solidifies. This affords opportunities for a simple manufacturing technique comprising a smaller number of operations in relation to known methods. In other words, the blade and the ring element form what is known as a T-joint. More specifically, in the environment of the present invention, "T-joint" refers to a portion of the ring element that forms the crosspiece part of the T, and an outer portion of the blade, in the radial direction, forms the upright part of the T which joins the crosspiece part.

By suitable selection of the material composition of the ring element, the blade and the joining material, it is possible to produce a homogeneous, strong connection.

The method can be controlled so that the joining material either melts itself, or forms a melt via a reaction with the parent material in the adjacent parts.

The open joint geometry affords opportunities for simple and cost-effective non-destructive testing with conventional methods. Surface defects can be detected with fluorescent penetrant, for example, and internal defects with ultrasound.

According to a preferred embodiment of the invention, a plurality of blades are joined together with the ring element at a mutual spacing in the peripheral direction. This means that little or no joining together of the ring element in the peripheral direction is necessary in order to form a ring.

According to a preferred development (variant, or embodiment), the ring element forms a continuous ring before being applied to the blades.

According to another preferred embodiment, said ring element forms an outer ring, and the blades are joined together with the ring element in such a way that they project inward in the radial direction from the ring element. In many stator and rotor applications, a radially inner hub is present and from which the blades project in the radial direction. By virtue of the joining technique described above, an annular cover is thus arranged outside the blades in the radial direction and in contact therewith.

According to a development of the preceding embodiment, the ring element is joined together with a disk-shaped or annular member that has a plurality of radially projecting blades. A first of the ring elements and the disk-shaped or annular member is configured with a radially inner surface which, at least partially, is angled in relation to a central axis thereof. A radially directed outer surface of the second of the ring elements and the disk-shaped or annular member is configured with an essentially corresponding angled shape. The ring element and the disk-shaped or annular member are connected via relative movement therebetween in the axial direction, and in such a way that the angled surfaces are brought into contact with one another. The ring element, also referred to as a cover hereinbelow, can thus be fitted in the intended place around the disk-shaped or annular member in a simple and time efficient manner. The design of the joint surfaces provides that the cover ring is self-adjusting on the disk-shaped or annular member during application. In the present context, the terminology disk-shaped or annular member describes either an inner part, or a hub, or an outer part, from which the blades project. Such a part is usually considerably more robust than the cover itself in order to be capable of holding the blades.

According to a development of the preceding embodiment of the invention, the contact surface of the cover is configured with a conical shape. This creates possibilities for a rapid connection method which is reliable so far as centering is concerned. The contact surface of the disk-shaped or annular member is suitably designed in such a way that it defines a conical shape.

According to another embodiment, said joining material is provided in the form of a layer. This can take place in a simple and cost-effective manner by spraying the joining material onto the surface of one of the parts to be joined together.

Further advantageous embodiments of the invention emerge from the patent claims and the description contained herein.

BRIEF DESCRIPTION OF THE DRAWINGS

The invention will be described in greater detail below with reference to the embodiments shown in the accompanying drawings, in which.

MODE FOR THE INVENTION

Figure 1:
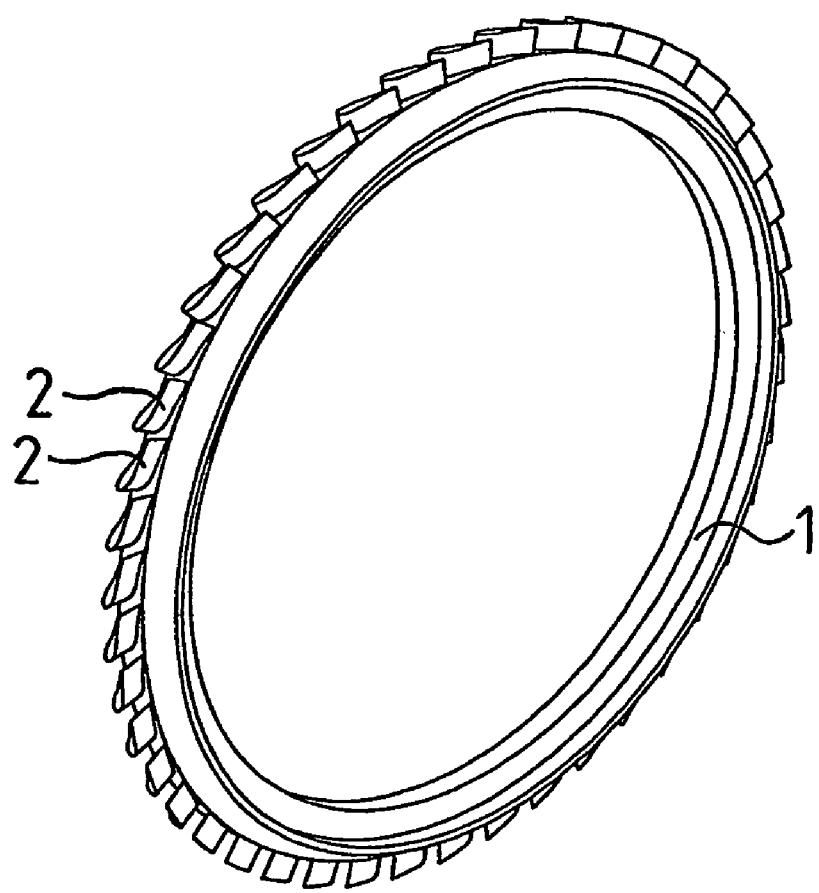
FIG. 1 illustrates a perspective view of a disk-shaped or annular member with a plurality of blades intended for guiding a gas flow.

FIG. 1 illustrates a disk-shaped or annular member 1 with a plurality of blades 2, or guide vanes, which are provided at a periphery thereof, and which project in the radial direction. The blades 2 are arranged one after another on a path extending around the member for guiding a gas flow. The disk-shaped or annular member 1 defines an essentially circular cross-sectional shape.

Figure 2:
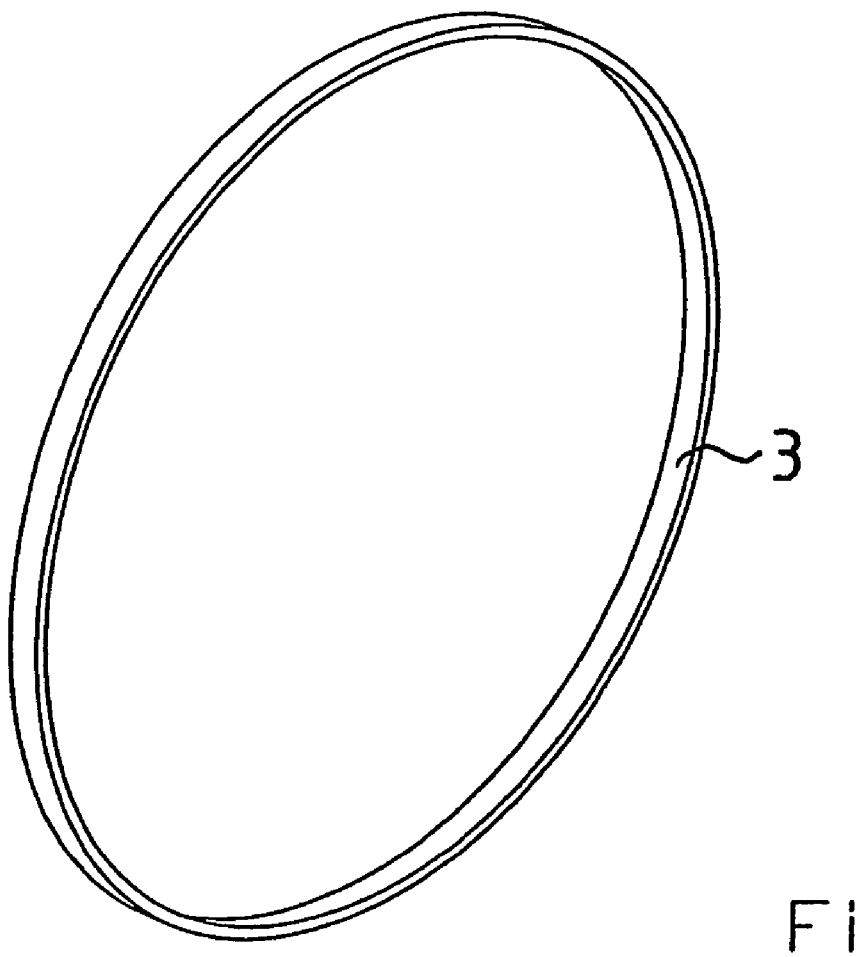
FIG. 2 illustrates a perspective view of a ring element in the form of a cover according to a first embodiment.

FIG. 2 illustrates a ring element in the form of an annular cover 3, or a platform, configured according to a first embodiment. The cover is intended to be arranged outside the blades 2, in the radial direction, and in contact therewith. The annular cover 3 is continuous in the peripheral direction and has an essentially circular shape. The cover 3 also has the shape of a band and has a slightly greater extent in the axial direction than the extent of the blades in the axial direction of the disk-shaped or annular member 1. The cover has a considerably thinner wall thickness in relation to the disk-shaped or annular member 1 and is intended to counteract leakage from a pressure side to a suction side of the blade during operation.

Figure 3:
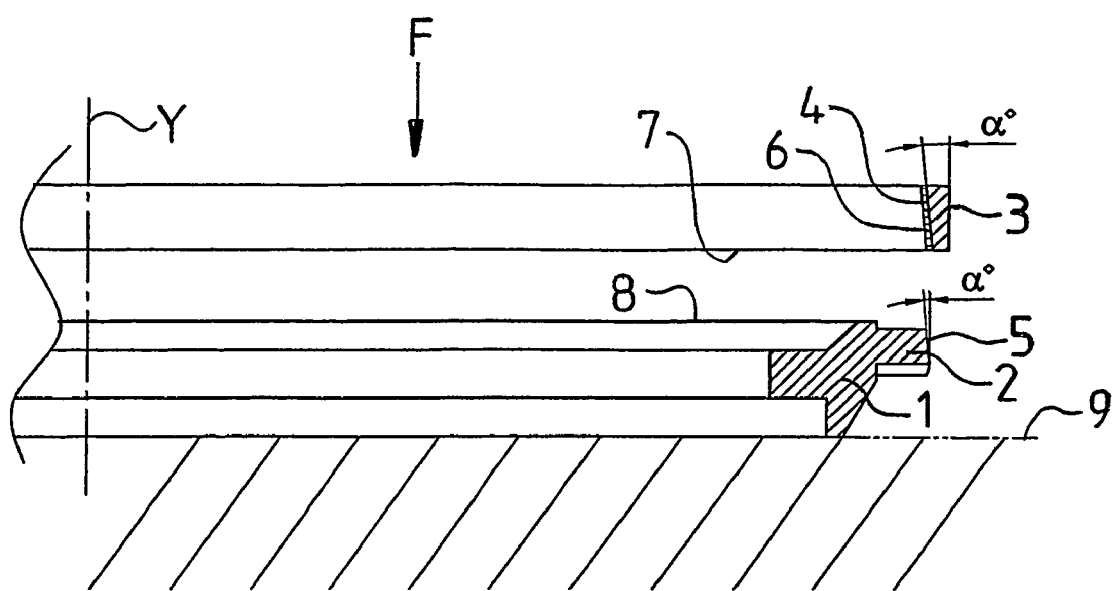
FIG. 3 illustrates a side view, shown in partial cross-section, of the disk-shaped or annular member configured according to embodiment of the invention depicted in FIG. 1 and the ring element configured according to FIG. 2 during connection of these.

FIG. 3 illustrates a method for connecting the annular cover 3 to the disk-shaped or annular member 1.

The cover 3 is configured with a radially inner surface 4 which, at least partially, is angled in relation to the central axis of the cover. More specifically, the radially inner surface 4 of the cover 3 has the shape of a lateral surface of a truncated right circular cone. The inner surface of the cover 3 therefore has an essentially rectilinear surface in cross section. The inner surface 4 has an inclination of less than forty-five degrees and suitably less than twenty degrees. The inner surface 4 preferably has an inclination of one-half to ten degrees, and in particular, an inclination of one to six degrees relative to the central axis of the cover.

The radially outer surface 5 of the disk-shaped or annular member 1 has an angled shape essentially corresponding to the inner surface 4 of the cover 3.

The radially outer surface 5 of the disk-shaped or annular member 1 therefore has essentially the shape of the lateral surface of such a truncated right circular cone. In other words, it is the radially outer surfaces of the blades 2 that together form the shape of the lateral surface of the truncated right circular cone.

As the blades 2 are arranged at a mutual spacing in the peripheral direction, the lateral surface of the disk-shaped or annular member 1 is of course discontinuous in the peripheral direction. The outer surface 5 has an inclination corresponding to the inclination of the inner surface of the cover 3.

The radially inner surface of the cover 3 is provided with a layer 6 of a joining material. This material is intended to join the cover 3 and the disk-shaped or annular member 1 together with a butt joint when heated. The joining material can, for example, be sprayed in the form of paste onto the inner surface of the cover before connection.

The cover 3 and the disk-shaped or annular member 1 are connected via relative movement therebetween in the axial direction and in such a way that the side 7 of the cover 3 which has an opening of greater diameter is moved toward that side 8 of the disk-shaped or annular member 1 which has the smaller outside diameter. When such relative movement takes place, the inner surface 4 of the cover 3 will, via the layer 6, interact with the outer surface 5 of the disk-shaped or annular member 1.

According to FIG. 3, the parts are connected by the disk-shaped or annular member 1 being positioned on a support 9 and the cover ring 3 being moved toward the member 1 in the axial direction; that is to say, vertically from above. The application of the cover ring is illustrated in FIG. 3 by the force arrow, F.

By virtue of the design of the contact surfaces 4, 5 and the effect of gravity on the cover ring 3, the connection is self-adjusting, and any play arising between the parts is minimized.

After connection of the cover 3 and the disk-shaped or annular member 1, the stator component or rotor component formed in this way is placed in a furnace. The component is heated and the cover 3 is joined together with the disk-shaped or annular member 1. This is accomplished by the joining material in the layer 4, itself, melting and/or via reaction with the material in the contact surface of the cover 3 and, respectively, the disk-shaped or annular member 1, and thereby forming a melt in the boundary layers. The heating is preferably carried out at a temperature close to, or above the melting temperature of the joining material, but below the melting temperature of the blades and the stator or rotor component.

The joining material wets the contact surfaces 4, 5 and fills any play arising between the surfaces, and scratches and other irregularities in the surfaces which reduces the risk of bonding defects.

In order to ensure a homogeneous high-strength joint, pressure is applied to the cover 3 and the disk-shaped or annular member 1 during heat-treatment. Use can be made of, for example, a pressure plate in order to apply pressure in the axial direction. An alternative way of applying pressure is by means of spring force.

According to a further alternative, a detachable annular element is clamped over the cover ring and is retained there during the heat-treatment.

Figure 4:
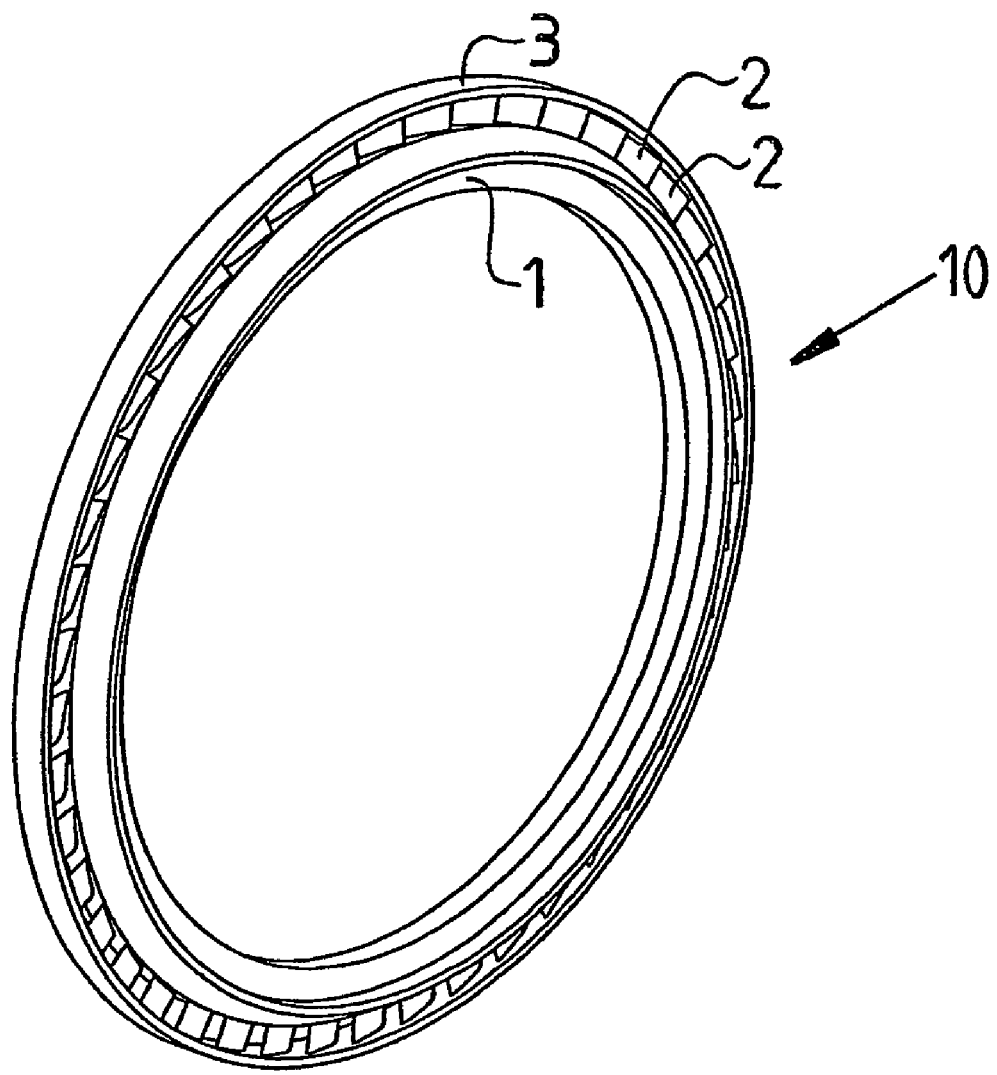
FIG. 4 illustrates a perspective view of a stator component or rotor component which results from the method.

FIG. 4 shows a stator component or rotor component 10 which is a result of the manufacturing method described above. When the finished stator component or rotor component 10 is mounted in, for example, a space turbine, the component is suitably, but not necessarily, arranged facing in such a direction that a pressure difference occurring during operation presses the cover 3 firmly against the disk-shaped or annular member 1.

Figure 5:
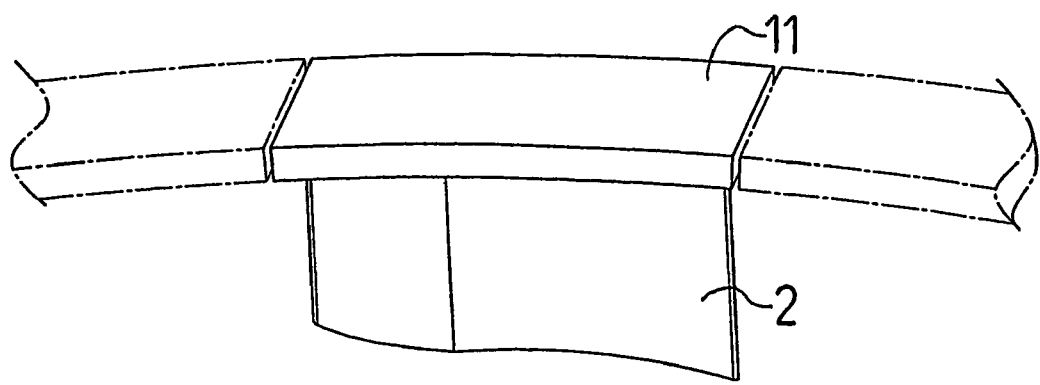
FIG. 5 illustrates diagrammatically, in a perspective view, a ring element in the form of a cover configured according to a second embodiment of the invention.

FIG. 5 shows a ring element 11 configured according to a second embodiment and a blade 2 is joined together with the ring element. A plurality of such ring elements are intended to be connected to one another in the peripheral direction in order to form a continuous annular cover (see the broken lines in FIG. 5). The blade is also, at its end which is located opposite the ring element, connected to a central part, for example in the form of a ring (not shown).

Figure 6:
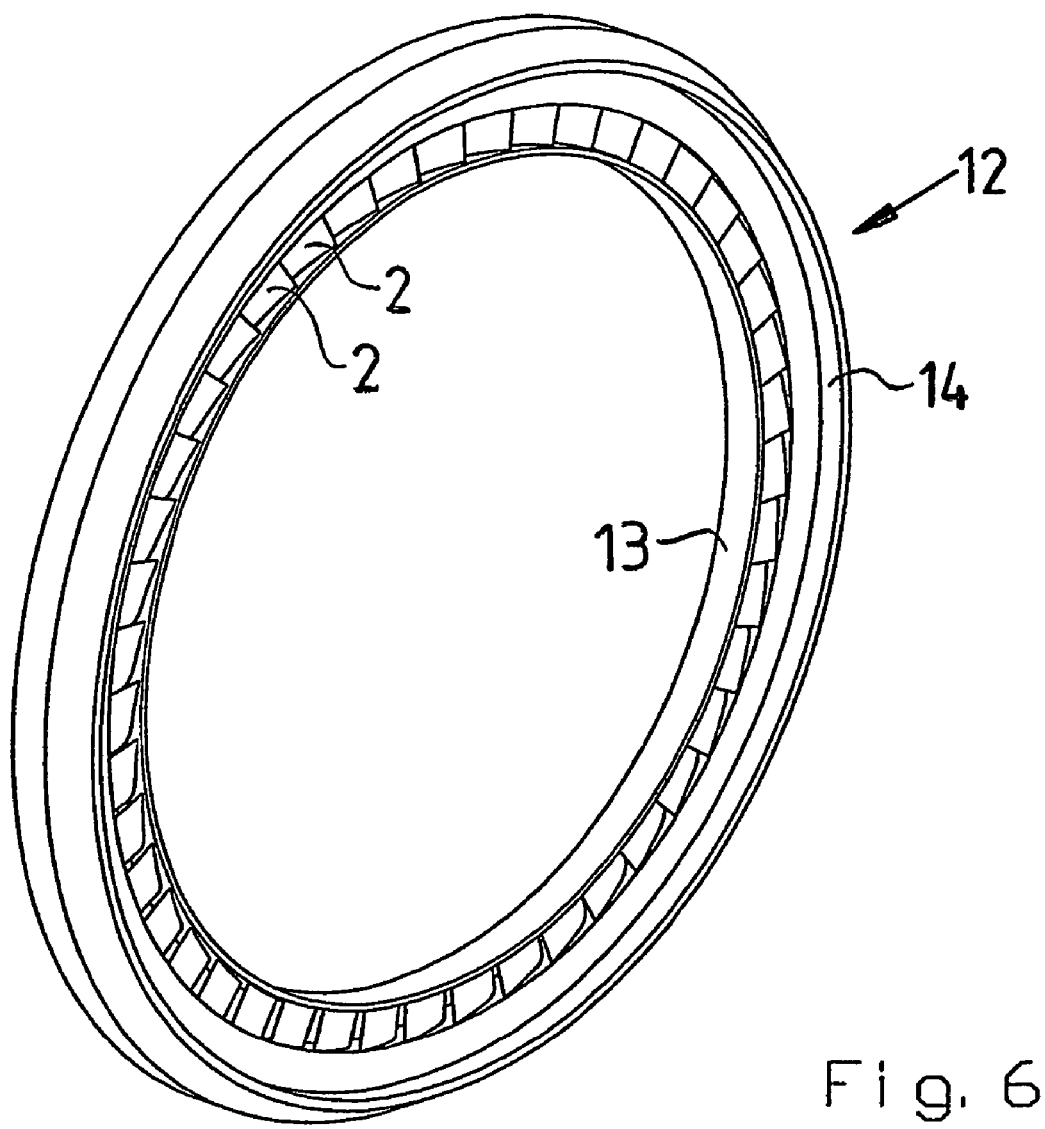
FIG. 6 illustrates a perspective view of a variant of the stator component or rotor component according to FIG. 4.

FIG. 6 shows a variant 12 of the stator component or rotor component described above. In this case, the blades 2 of the disk-shaped or annular member 14 project inward in the radial direction, and a cover 13 is arranged inside the blades in the radial direction.

The manufacture of this component 12 is carried out in a manner similar to that described above in connection with FIG. 3. In this case, it is the radially inner surface of the disk-shaped or annular member 14 and the radially outer surface of the cover 13 that are provided with, or configured into the conical shape.

The joining material can consist of, for example, solder by which the parts are joined together. The soldering technique can in turn be diffusion soldering.

The disk-shaped or annular member is manufactured by an outer surface of a disk-shaped or annular basic piece being turned to the conical shape. The blades are then milled out from the basic piece in order to form the disk-shaped or annular member. The conical surface of the cover ring is also produced by turning.

The stator component or rotor component manufactured according to the method described above is intended for a flow in the axial direction.

The cover and the disk-shaped or annular member can consist of, for example, stainless steel. The joining material can consist of, for example, an alloy comprising nickel and gold.

From the description above, it is intended to make clear that the expression "that a joining material is provided in contact with at least one of the blade and the ring element, that the blade and the ring element are arranged in relation to one another in such a way that they are joined together via a butt joint when heated" does not necessarily mean two different steps following one another in chronological order, but they can be carried out essentially simultaneously, or in reverse order.

The invention is not to be regarded as being limited to the illustrative embodiments described above, but a number of further variants and modifications are conceivable within the scope of the following patent claims.

For example, those surfaces of both the cover ring and the disk-shaped or annular member which are intended for contact can have a design which is different from the smooth, conical surface described above for fitting together. The contact surfaces can have, for example, a rounded design. A first of the contact surfaces can thus have a convex shape, and a second of the contact surfaces can have a concave shape.

According to an alternative to applying the joining material to the contact surface of the cover by spraying-on in order to form said layer, the joining material can be provided in the form of a film; that is to say, an additional separate part in solid form. The film suitably has a thickness of 0.02-0.2 mm.

It should be appreciated, however, that the dimensions of the component parts of the invention can be varied. For example, the disk-shaped or annular member 1 depicted in FIG. 1 can have essentially the same wall thickness as the cover 3.

According to an alternative to milling the blades out from a basic piece in the radial direction, it is possible to manufacture the blades individually by, for example, casting. The blades are then joined to rings on both the top side and the root side by T-joints and the method described above.

According to an alternative to the technique described above for applying the cover around the blades, the cover could be designed as a single annular part which is resilient and has a discontinuity in the peripheral direction. The cover is then pulled over the blades, after which the two ends of the cover ring are brought together and connected. According to another alternative, the cover is formed by a continuous ring which is shrunk on and over the blades.

It should also be appreciated that the melting temperature of the joining material does not necessarily have to lie below the melting temperature of the blades and the stator component or rotor component in order to achieve the desired melt and joining-together when solidification takes place.

The invention claimed is:

1. A method for manufacturing a stator or rotor component, comprising:
   providing a disk-shaped member comprising a hub and a plurality of blades extending radially outwardly from said hub, wherein free end surfaces of the blades are inclined at an acute, non-zero, frustroconical angle relative to an axial axis of the disk-shaped member;
   providing a continuous ring-shaped cover member, wherein an inner surface of said cover member is inclined at an acute, non-zero, frustroconical angle relative to an axial axis of the cover member corresponding to the acute, non-zero angle of the free end surfaces of the blades;
   providing a joining material on at least one of 1) the free end surfaces of the blades and 2) the inner surface of the cover member;
   moving the disk-shaped member and the cover member axially toward each other until the angled free end surfaces of the blades and the angled inner surface of the cover member almost contact each other so as to form a butt joint with said joining material sandwiched therebetween;

heat-treating the joining material until it forms a melt; and causing or allowing the joining material melt to solidify so as to join the blades to the cover member.

2. The method of claim 1, further comprising applying pressure to said disk-shaped member and said cover member, acting in an axial direction, during said heat-treating so as to force said disk-shaped member and said cover member toward each other.

* * * * *